Patented July 1, 1924.

1,500,013

UNITED STATES PATENT OFFICE.

KARL THIESS, OF LINDLINGEN, NEAR HOCHST-ON-THE-MAIN, AND CARL JOSEF MÜLLER, OF HOCHST-ON-THE-MAIN, GERMANY, ASSIGNORS TO FARBWERKE VORM. MEISTER LUCIUS & BRUNING, OF HOCHST-ON-THE-MAIN, GERMANY, A CORPORATION OF GERMANY.

INDIGOID VAT DYESTUFF AND PROCESS OF MAKING SAME.

No Drawing.   Application filed April 17, 1924.   Serial No. 707,284.

*To all whom it may concern:*

Be it known that we, KARL THIESS and CARL JOSEF MÜLLER, citizens of Germany, residing at Lindlingen, near Hochst-on-the-Main, and Hochst-on-the-Main, Germany, respectively, have invented certain new and useful Improvements in Indigoid Vat Dyestuffs and Processes of Making Same, of which the following is a specification.

We have found that new indigoid vat-dyestuffs are obtained by condensing the 5.6-benzo-3-ketodihydro-1-thionaphthene or its halogenated derivatives with the reactive α-derivatives of naphthisatine and its halogen derivatives. In this manner pure blue to bluish-black vat-dyestuffs are obtained which are of excellent fastness. If the 5.6-benzo-3-ketodihydro-1-thionaphthene which does not contain halogen, is used for the condensation, there must, in order to obtain the same good result, be introduced halogen according to the known methods.

The following examples illustrate our invention:

(1) 240 parts by weight of 5.6-benzo-7-chloro-3-ketodihydro-1-thionaphthene are dissolved while hot in ten times the quantity of chlorobenzene and after adding 295 parts by weight of monobromo-6-naphthisatine-α-chloride, heated to 100° C., for one hour while stirring. The dyestuff thus obtained is filtered off washed and dried. It forms a bluish-black crystalline powder which in alkaline hydrosulphite solution forms a reddish brown vat and dyes the textile fibre bluish-black tints of great fastness.

(2) If for the bromo-6-naphthisatine-α-chloride be substituted the 6-naphthisatine-α-chloride itself, a similar dyestuff is obtained.

(3) By condensing the 5.6-benzo-7-chloro-3-ketodihydro-1-thionaphthene in the usual manner with the α-derivatives of the halogenated 2.3-naphthisatines, vat dyestuffs dyeing blue tints with a green hue of great purity are obtained.

Having now described our invention, what we claim is:

1. The process of preparing indigoid vat-dyestuffs which consists in condensing a halogen substituted 5.6-benzo-3-ketodihydro-1-thionaphthene with the reactive α-derivatives of the naphthisatines which condensation product may be subsequently halogenated.

2. As new products, the bodies of the general formula:

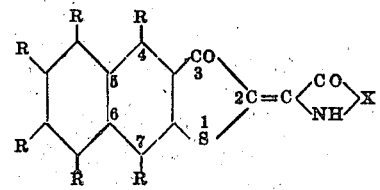

wherein R stands for hydrogen and halogen, at least one R being halogen, and X stands for a naphthalene residue, which may be substituted.

In testimony whereof, we affix our signatures.

KARL THIESS.
CARL JOSEF MÜLLER.

Witnesses:
JOEEL GUESTI,
GABRIELE FLESCH.